United States Patent
Duggirala et al.

(10) Patent No.: US 10,000,393 B2
(45) Date of Patent: Jun. 19, 2018

(54) ENHANCEMENT OF DEWATERING USING SOY FLOUR OR SOY PROTEIN

(71) Applicant: Ecolab USA Inc., St. Paul, MN (US)

(72) Inventors: Prasad Y. Duggirala, Naperville, IL (US); Weiguo Cheng, Naperville, IL (US); Darlington Mlambo, Naperville, IL (US); Tarun Kumar Bera, Pune (IN); Luiz Wanderley Bratfisch Pace, Campinas (BR)

(73) Assignee: ECOLAB USA INC., St. Paul, MN (US)

( * ) Notice: Subject to any disclaimer, the term of this patent is extended or adjusted under 35 U.S.C. 154(b) by 529 days.

(21) Appl. No.: 14/596,899

(22) Filed: Jan. 14, 2015

(65) Prior Publication Data

US 2016/0200600 A1    Jul. 14, 2016

(51) Int. Cl.
| | |
|---|---|
| *C02F 1/54* | (2006.01) |
| *C02F 1/52* | (2006.01) |
| *C02F 11/14* | (2006.01) |
| *C02F 1/56* | (2006.01) |

(52) U.S. Cl.
CPC .......... *C02F 1/5263* (2013.01); *C02F 1/5236* (2013.01); *C02F 1/54* (2013.01); *C02F 1/547* (2013.01); *C02F 11/14* (2013.01); *C02F 1/56* (2013.01); *C02F 2305/04* (2013.01)

(58) Field of Classification Search
CPC ........ C02F 1/5263; C02F 11/14; C02F 1/547; C02F 1/5236; C02F 2305/04; C02F 1/56; C02F 1/54
See application file for complete search history.

(56) References Cited

U.S. PATENT DOCUMENTS

| | | | | |
|---|---|---|---|---|
| 4,542,169 | A * | 9/1985 | Costerton | A01N 43/80 521/122 |
| 5,676,796 | A | 10/1997 | Cutts | |
| 5,763,530 | A * | 6/1998 | Chen | C02F 1/54 524/211 |
| 5,972,094 | A * | 10/1999 | Bates | D21H 21/16 106/145.1 |
| 6,706,144 | B1 | 3/2004 | Furman, Jr. et al. | |
| 6,733,674 | B2 | 5/2004 | Sarkar et al. | |
| 7,641,766 | B2 | 1/2010 | St. John et al. | |
| 7,901,543 | B2 | 3/2011 | St. John et al. | |
| 8,071,524 | B2 | 12/2011 | Horton | |
| 8,858,759 | B1 * | 10/2014 | Duggirala | D21H 17/24 162/158 |

(Continued)

OTHER PUBLICATIONS

Smook, Gary A.; "Non-fibrous Additives to Papermaking Stock"; Second Edition Handbook for Pulp & Paper Technologists; Chapter 15; p. 220 (3 pages); Angus Wilde Publications; Vancouver, B.C.

*Primary Examiner* — Taiwo Oladapo
(74) *Attorney, Agent, or Firm* — Eric D. Babych; Brinks Gilson & Lione

(57) ABSTRACT

Dewatering agents and methods of dewatering wastewater slurries are provided. Also disclosed are methods for improving the separation of solids from water. The water may be produced water, raw water, or wastewater, for example. The dewatering agents can be in solutions and the dewatering agent solutions may include various components in addition to soy protein, soy flour or a combination of soy flour and soy protein.

14 Claims, 2 Drawing Sheets

(56) References Cited

U.S. PATENT DOCUMENTS

| | | | |
|---|---|---|---|
| 2002/0144951 A1* | 10/2002 | Sarkar | C02F 1/56 |
| | | | 210/730 |
| 2004/0237846 A1* | 12/2004 | Farrar | C08G 73/0226 |
| | | | 106/499 |
| 2007/0256987 A1 | 11/2007 | Singleton et al. | |
| 2008/0230193 A1* | 9/2008 | Mori | B01D 21/01 |
| | | | 162/164.1 |
| 2010/0184603 A1* | 7/2010 | Stoesser | A01N 25/30 |
| | | | 504/362 |
| 2011/0008637 A1 | 1/2011 | Broadus et al. | |

\* cited by examiner

ENHANCEMENT OF DEWATERING USING SOY FLOUR OR SOY PROTEIN

BACKGROUND

1. Field of the Invention

This disclosure relates to compositions and methods for the separation of solids from water. More particularly, the disclosure relates to the use of soy based dewatering agent solutions to improve the separation of solids from water.

2. Description of the Related Art

The dewatering of municipal and industrial sludges (slurries) containing suspended organic solids is typically accomplished by mixing the sludge with one or more chemical reagents in order to induce a state of coagulation or flocculation of the solids. The solids are then separated from the water using mechanical devices, such as plate and frame filter presses, belt-filter presses, centrifuges, and the like.

In a typical municipal sewage plant, wastewater remaining after coarse solids are settled out of the incoming sewage influent is conveyed into a biological clarifying stage, where the dissolved and suspended organic material is decomposed by microorganisms in the presence or absence of air. These processes are referred to as aerobic digestion and anaerobic digestion, respectively.

The organic matter obtained as a result of this decomposition is largely bound in the form of a mass of microorganisms. This mass is precipitated as an activated sludge. The water may be released into waterways or allowed to seep away in sewage irrigation fields, but the activated sludge must be dewatered prior to disposal.

The objective of a dewatering process is to maximize the efficiency of water removal, as decreasing the amount of water retained in the dewatered solids (sludge cake) leads to decreased transport and disposal costs. Moreover, obtaining a dry sludge cake after the dewatering process can eliminate the need to subject the cake to an incineration process, thus eliminating the need for further fuel costs and time expenditure.

BRIEF SUMMARY

Methods for improving the separation of solids from water are disclosed herein. In one aspect, the method for improving the separation of solids from water comprises the step of adding a dewatering agent solution comprising an effective amount of a soy based component, a non-ionic surfactant, sodium meta-bisulfite, caustic, and a preservative, to the water.

In another aspect, a method for dewatering a wastewater slurry containing solids is disclosed. This method comprises the step of adding to the wastewater slurry an aqueous dewatering agent solution comprising an effective amount of a soy based component, a non-ionic surfactant, sodium meta-bisulfite, caustic, and a preservative; forming a mixture of water, dewatering agent solution, and flocculated solids; and separating the flocculated solids from the water.

In an additional aspect, a dewatering agent solution for improving the separation of solids from water is disclosed. The dewatering agent solution comprises water, a soy based component, a non-ionic surfactant, sodium meta-bisulfite, caustic, a preservative, and optionally a stabilizer.

The foregoing has outlined rather broadly the features and technical advantages of the present disclosure in order for the detailed description that follows to be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE SEVERAL VIEWS OF THE DRAWINGS

A detailed description of the invention is hereafter described with specific reference being made to the drawings in which.

DETAILED DESCRIPTION

Figure 1:
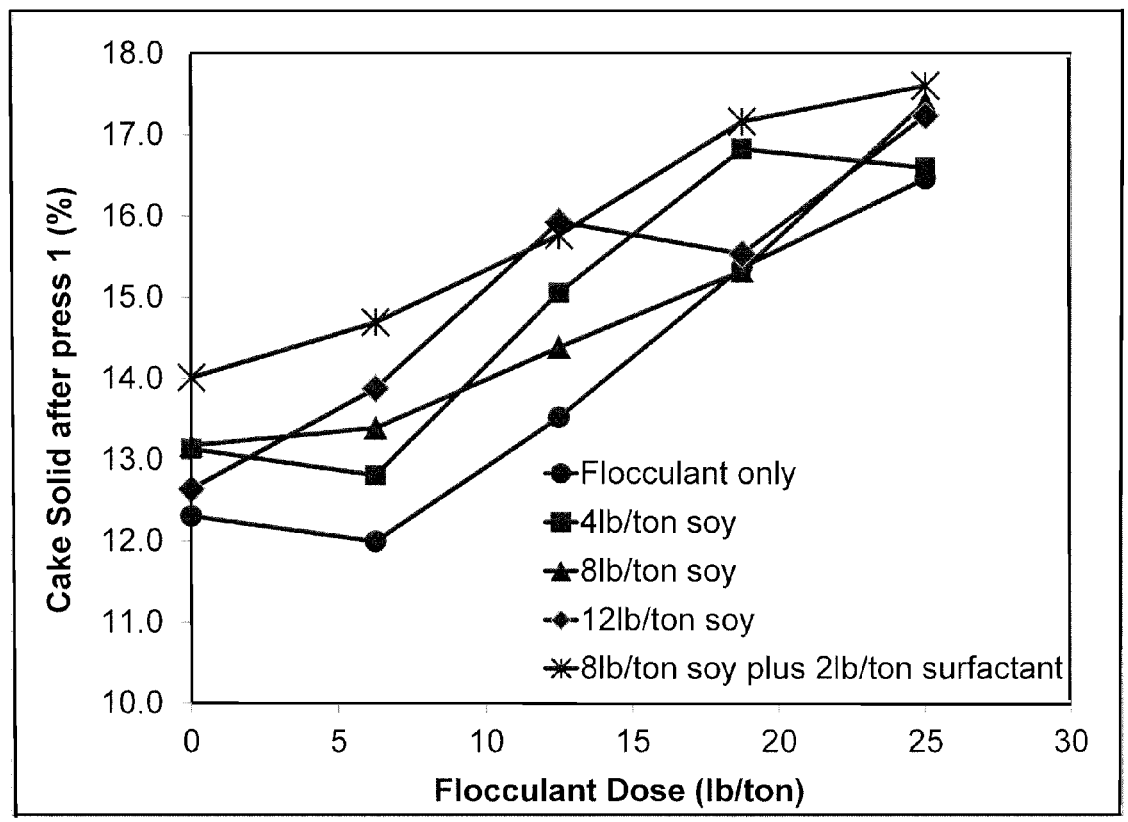
FIG. 1 depicts experimental data showing the effect of flocculant dose, soy flour, and soy flour plus surfactant dewatering agent solutions on the dryness of a sludge cake after a first static press test.

Compositions and methods for improving the separation of solids from water are disclosed herein. In certain aspects, the water is selected from produced water, raw water, and wastewater. Compositions and methods for improving the dewatering efficiency of wastewater slurries are also disclosed herein.

The present inventors have unexpectedly discovered that dewatering and/or separation can be maximized by adding certain dewatering agents to the water and/or the slurries. It is to be understood that throughout the present disclosure, reference to a "dewatering agent" or "dewatering agent solution" can mean a single dewatering agent or dewatering agent solution, or it can mean any combination of two, three, four, or more of the presently disclosed dewatering agents or dewatering agent solutions. Any of the presently disclosed dewatering agents can be added to the water and/or slurry as a solution, such as an aqueous solution. If more than one dewatering agent is used in connection with a disclosed method, the dewatering agents or dewatering agent solutions can be added in any order or particular dewatering agents can be added simultaneously in a single solution.

In certain aspects, the presently disclosed dewatering agent solution comprises soy. Hereinafter, this type of dewatering agent solution can be referred to as a "soy based dewatering agent solution," or "a dewatering agent solution comprising a soy based component," and is intended to include all formulations listed in this paragraph. For example, in one aspect, the presently disclosed dewatering agent solution comprises soy flour. In accordance with the present disclosure, it is to be understood that soy flour comprises about 50% starch and about 50% soy protein. In another aspect, the presently disclosed dewatering agent solution comprises soy protein. In an additional aspect, the dewatering agent solution comprises a combination of soy flour and soy protein.

In some aspects, the dewatering agent solution consists of soy protein, water, a non-ionic surfactant, sodium meta-bisulfite, caustic (such as sodium hydroxide), and a preservative. In still further aspects, the dewatering agent solution consists of soy flour, water, a non-ionic surfactant, sodium meta-bisulfite, caustic, a preservative, and an optional stabilizer. In other aspects, the dewatering agent solution consists of a combination of soy protein and soy flour, water, a non-ionic surfactant, sodium meta-bisulfite, caustic, a preservative, and an optional stabilizer.

A solution of soy flour can be prepared by one of ordinary skill in the art and as an illustrative, non-limiting example, about 10 grams of soy flour can be dispersed into about 90 grams of water. Next, approximately 15 mM of $Na_2S_2O_5$ can be added and the pH of the solution can be adjusted to between about 7 and about 10 by adding a base, such as, but not limited to, 0.1 N NaOH. Without wishing to be bound by any theory, it is hypothesized that the sodium metabisulfite ($Na_2S_2O_5$) assists with the dissolution of the soy flour to release soy proteins. The resulting solution may be stirred for about 1 hour before its addition to the water or wastewater slurry. Again, the foregoing is simply an illustrative example of a method of making a dewatering agent solution comprising soy flour and the particular amounts set forth can be adjusted based upon the amount of dry solids in the water or slurry/sludge. Additionally, other components may be mixed into the soy flour solution, such as a non-ionic surfactant, a stabilizer (which is further described below), and/or a preservative.

A solution of soy protein can be prepared by one of ordinary skill in the art and in certain aspects, it can be prepared in a manner similar to the solution of soy flour. However, when preparing the solution of soy protein, one would not need to add sodium metabisulfite. Soy protein can be easily dissolved into water with the pH adjusted to about 8.

The effective amounts of dewatering agent in the dewatering agent solution are empirically determined based upon the materials or solids contained in the slurry or the water. With respect to the soy flour or soy protein component of the dewatering agent solution, the dose of the soy component is from about 0.05 lb/ton to about 20 lb/ton, based on pounds of soy per ton of dry solids in the water or the slurry. In further aspects, the dose of the soy component is from about 1 lb/ton to about 15 lb/ton, or from about 2 lb/ton to about 10 lb/ton, based on pounds of soy per ton of dry solids in the water or the slurry. In some aspects, the dose of the soy component is from about 4 lb/ton to about 12 lb/ton and, in other aspects, the dose of the soy component is from about 8 lb/ton to about 12 lb/ton, based on pounds of soy per ton of dry solids in the water or the slurry.

The dewatering agent solution in accordance with certain aspects of the present disclosure is a soy based dewatering agent that may be used together with a flocculant. Any type of flocculant can be used in accordance with the present disclosure, such as an anionic, cationic, or amphoteric flocculant. In certain aspects, the flocculant is a cationic polymer. Therefore, in certain aspects, a soy based dewatering agent solution can be added to the wastewater slurry or to any body of water containing solids and a separate dewatering agent solution comprising a flocculant, such as a cationic polymer, can be added to the wastewater slurry or other body of water containing solids. In some aspects, the soy based dewatering agent solution can be added first, followed by the subsequent addition of the dewatering agent solution comprising the flocculant. In other aspects, the soy based dewatering agent solution can be added after the addition of the dewatering agent solution comprising the flocculant.

Cationic polymer flocculants contemplated by the present disclosure can include monomers such as, but not limited to, acrylamide, allyl amine, vinyl amine, dialkylaminoalkyl acrylates, dialkylaminoalkyl acrylate quaternary salts, dialkylaminoalkyl acrylate acid salts, dialkylaminoalkyl methacrylates, dialkylaminoalkyl methacrylate quaternary salts, and dialkylaminoalkyl methacrylate acid salts. Alkyl groups generally include from about 1 to about 10 carbon atoms. In certain aspects, the alkyl groups include from about 1 to about 7 carbon atoms and, in additional aspects, the alkyl groups include from about 1 to about 4 carbon atoms.

Specific examples of cationic monomers that can be used in connection with the presently disclosed cationic polymers include, but are not limited to, one or more members selected from the group consisting of dimethylaminoethyl acrylate methyl chloride quaternary salt (DMAEA.MCQ), dimethylaminoethyl acrylate methyl sulfate quaternary salt, dimethyaminoethyl acrylate benzyl chloride quaternary salt, dimethylaminoethyl acrylate sulfuric acid salt, dimethylaminoethyl acrylate hydrochloric acid salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dialkylaminoalkylacrylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate, diallyldiethylammonium chloride and diallyldimethyl ammonium chloride (DADMAC).

In one particular aspect, a dewatering agent solution comprising soy flour is added to the water or wastewater slurry in addition to a dewatering agent solution comprising a copolymer of acrylamide and dimethylaminoethylacrylate methyl chloride. In certain aspects, this copolymer comprises from about 1% to about 15% dimethylaminoethylacrylate methyl chloride and from about 99% to about 85% acrylamide. In other aspects, the copolymer comprises about 90% acrylamide and about 10% dimethylaminoethylacrylate methyl chloride.

In certain aspects, the dose of the flocculant is from about 0 lb/ton to about 30 lb/ton or from about 2 lb/ton to about 10 lb/ton, based on pounds of active polymer per ton of dry solids in the water or the slurry. In other aspects, the dose of the flocculant is from about 12 lb/ton to about 30 lb/ton and, in other aspects, the dose of the flocculant is from about 6 lb/ton to about 25 lb/ton, based on pounds of active polymer per ton of dry solids in the water or the slurry.

The flocculant dewatering agent solution may be in the form of an emulsion, such as a water in oil emulsion with, for example, about 42% polymer actives. The product would need to be made down or "inverted" before use and as one illustrative example, one could invert the polymer in the lab by mixing about 1 g of the flocculant into about 99 g of water under about 800 rpm stirring for about 30 minutes. This 1% product can then be diluted to a desired concentration (typically between about 0.01% and about 1%) before addition to the water or wastewater slurry. In the field, the product can be inverted using a make-down unit (mixing device) into about a 0.5% to about 1% solution, then post diluted to the desired solution concentration before feeding the solution into the water or wastewater slurry using a feeding pump.

In accordance with certain aspects of the present disclosure, a dewatering agent solution can also comprise one or more surfactants. Surfactants are compounds that lower the water surface tension, meaning the interfacial tension between water and one other liquid, or that between water and a solid. Surfactants are usually organic compounds that are amphiphilic, meaning they contain both hydrophobic groups (their tails) and hydrophilic groups (their heads). Therefore, a surfactant contains both a water insoluble component and a water soluble component. Surfactants can carry a cationic charge, an anionic charge, or no charge at all. In one aspect of the present disclosure, the surfactant can be a non-ionic surfactant, such as a triblock copolymer of PEO-PPO-PEO, where PEO (polyethylene oxide) is hydrophilic and PPO (polypropylene oxide) is more hydrophobic. Thus, in one aspect of the present disclosure, a dewatering agent solution can comprise a triblock copolymer of PEO-PPO-PEO. Solutions of surfactants can be made by known processes in the art, such as adding a known amount of surfactant to water and mixing to form the solution.

Thus, in certain aspects, a dewatering agent solution for dewatering a wastewater slurry containing solids or for improving the separation of solids from water may comprise a soy based component and a surfactant, and the solvent may be water. The amounts of the soy based component and the surfactant have been outlined above. For example, in one aspect, the solution comprises from about 0.05 lb to about 20 lb of the soy based component per ton of solids in the water or the slurry and in other aspects, the solution comprises from about 8 lb to about 12 lb of the soy based component per ton of solids in the slurry or water. With respect to the surfactant, in one aspect, the solution comprises from about 0.1 lb to about 5 lb of the surfactant per ton of solids in the water or slurry and in an additional illustrative aspect, the solution comprises from about 1 lb to about 4 lb of the surfactant per ton of solids in the slurry or water. In one particular aspect, the soy based component comprises soy flour or soy protein and the surfactant is a triblock copolymer comprising polyethylene oxide and polypropylene oxide.

In particular aspects of the present disclosure, the dewatering agent solution comprises a mixture of soy flour and/or soy protein with one or more surfactants in water, and optionally caustic, sodium meta-bisulfite, a stabilizer, and/or a preservative. A representative, illustrative method of creating this solution comprises adding about 10 g soy flour into about 87.5 g water, followed by the addition of about 15 mM $Na_2S_2O_5$. Next, about 2.5 g of the surfactant, such as a triblock copolymer of PEO-PPO-PEO, can be added to the water and the pH of the resulting solution can be adjusted to between about 7 and about 10, such as between about 8 and about 9, by adding a base, such as, but not limited to, 0.1 N NaOH. The solution can be stirred for about 1 hour before addition to the water or a wastewater slurry.

In any aspect, the presently disclosed methods can simply comprise adding a dewatering agent solution comprising a soy based component, such as soy flour and/or soy protein, to a body of water or a wastewater slurry. However, as noted above, additional dewatering agent solutions can be used. As illustrative examples, any method disclosed herein can include a first, soy based dewatering agent solution, such as a dewatering agent solution comprising soy flour and/or soy protein, and a second dewatering agent solution comprising one or more surfactants. Also, as noted above, a single dewatering agent solution can comprise both a soy based component and a surfactant as well as caustic, sodium meta-bisulfite, a stabilizer, and/or a preservative. The order of addition of each dewatering agent solution into the water or slurry is not critical and thus, the dewatering agent solutions can be added in any order to the water or wastewater slurry.

Other additives can be used in combination with the presently disclosed dewatering agent solutions. However, it is noted that no additional additives are required for the proper functioning of the presently disclosed dewatering agents. The other additives can include, for example, oxidants, coagulants, and/or enzymes as disclosed in U.S. Pat. No. 6,733,674, titled "Method of Dewatering Sludge Using Enzymes," which is incorporated into the present application by reference in its entirety.

As described above, the presently disclosed dewatering agent solutions may comprise soy flour and/or soy protein, water, surfactant, sodium meta-bisulfite ($Na_2S_2O_5$), and caustic, which may raise the pH of the solution to between about 7 and about 10, such as between about 8 and 9. However, in certain embodiments, depending upon the concentration of each component in the solution, solid separation may occur, leading to a non-homogeneous dewatering agent solution. Additionally, the pH may lower over time, which may not be desirable and also, foul odors have been known to develop with respect to certain embodiments of the dewatering agent solution. To overcome the foregoing problems, the present inventors have unexpectedly discovered that addition of a preservative and/or a stabilizer to the dewatering agent solution may be beneficial.

With respect to the solid separation issue in the dewatering agent solution, the inventors discovered that the insoluble starch portion of soy flour can settle down over time leading to a non-homogenous soy based dewatering agent solution. For example, if the concentration of soy flour in the dewatering agent solution is greater than about 15% by weight and the pH of the dewatering agent solution is within the range of about 8 to 9, there typically will be no solid separation due to the sufficiently high viscosity (greater than about 500 cP) of the dewatering agent solution. However, the inventors discovered that solid separation can become a problem when the concentration of soy flour in the dewatering agent solution is less than about 15% by weight.

The inventors discovered that the addition of a stabilizer can overcome the solid separation problem. Generally, a stabilizer only needs to be added to the dewatering agent solution when the dewatering agent solution comprises 15% or less by weight of soy flour. The stabilizer may be selected from the group of chemical compositions known as "gums". Illustrative, non-limiting examples of gums are carboxymethyl cellulose, guar gum, xanthan gum, gum acacia, starch based gums, and the like.

Before adding the gum component to the dewatering agent solution, the gum needs to be activated. In one embodiment, the gum is activated by dispersing it in water at about a 1% by weight concentration. Then, about 10-50 weight % of the activated 1% by weight gum solution may be added to the dewatering agent solution when the solution comprises less than about 15% by weight of soy flour.

With respect to the problems related to pH drop over time and the foul odor, the inventors unexpectedly discovered that the addition of a preservative could be beneficial. The inventors discovered that microbiological growth may be responsible for the pH drop in the dewatering agent solution, which may lead to the foul odor. As an illustrative, non-limiting example, the non-oxidizing biocide benzyl isothiazolin may be used as the preservative. In some embodiments, benzyl isothiazolin may be added to the dewatering agent solution at a concentration from about 0.1 to 0.2 weight %. Significant experimentation was carried out to determine an acceptable preservative and an acceptable amount of the preservative to be added to the dewatering agent solution.

While the presently disclosed dewatering agent solutions have been herein described as including numerous components, the following Table 1 lists certain, non-limiting embodiments of dewatering agent solutions. In some aspects of the present disclosure, a dewatering agent solution may not include all of the components listed in Table 1 and in other aspects, the dewatering agent solution may include components not listed in Table 1. Moreover, in some aspects, a dewatering agent solution may comprise the components listed in Table 1 and in other aspects, a dewatering agent may consist of the components listed in Table 1.

TABLE 1

| SL# | Components | Weight percentage (minimum) | Weight percentage (maximum) |
|---|---|---|---|
| 1 | Water | 36 | 76 |
| 2 | Soy flour powder | 10 | 20 |
| 3 | Non-ionic surfactant | 2.5 | 5 |
| 4 | Sodium meta-bisulfite | 0.9 | 1.8 |
| 5 | Caustic (50 wt % solution) | 0.9 | 1.8 |
| 6 | Stabilizer (1 wt % solution) | 0 | 50 |
| 7 | Preservative (benzyl isothiazolin) | 0.1 | 0.2 |

Although Table 1 specifically refers to component 2 as soy flour powder, soy protein may be substituted or the component 2 may be a mixture of soy flour and soy protein as described herein. The stabilizer is shown as optional in Table 1 because if the dewatering agent solution does not comprise soy flour and instead comprises soy protein, the stabilizer is not necessary. Further, if the dewatering agent solution comprises greater than about 15% by weight soy flour, the stabilizer is not necessary.

Methods for improving the separation of solids from water are disclosed herein. In one aspect, the method for improving the separation of solids from water comprises the step of adding a dewatering agent solution comprising an effective amount of a soy based component to the water. The soy based component can be soy protein and/or soy flour. The dewatering agent solution may further comprise water, a non-ionic surfactant, sodium meta-bisulfite, a preservative, a stabilizer, and/or caustic. The water may contain, or may have added thereto, a flocculant. The water can be any body of water containing solids. In certain aspects, the body of water is selected from the group consisting of produced water, raw water, and wastewater. In a particular aspect, the body of water is wastewater.

In an additional aspect, a method for dewatering a wastewater slurry containing solids is disclosed. The method comprises the steps of adding a dewatering agent solution comprising an effective amount of a soy based component to the slurry, thereby forming a mixture of water and flocculated solids, and separating the flocculated solids from the water. The soy based component can be soy protein and/or soy flour. The dewatering agent solution may additionally comprise water, a non-ionic surfactant, sodium meta-bisulfite, caustic, a preservative, and/or a stabilizer. The wastewater slurry may contain, or may have added thereto, a flocculant.

Any equipment known in the art may be used to separate the solids from the water. Illustrative, non-limiting examples are selected from a belt press, a plate and frame press, a filter press, a screw press, a centrifuge (or decanter), a tri-canter, a vacuum filter, a horizontal vacuum drum filter, and dewatering and press equipment in pulp and paper processes.

The foregoing may be better understood by reference to the following examples, which are presented for purposes of illustration and are not intended to limit the scope of the disclosure.

EXAMPLES

Example 1

A wastewater sludge/slurry containing 1.6% solids was obtained from the wastewater plant in a paper mill. The slurry was kept in a water bath at a temperature of about 60° C. A 250 ml sample of the slurry was added into a jar under 500 rpm mixing. A dewatering agent solution comprising soy flour or soy flour+surfactant (triblock copolymer of PEO-PPO-PEO) was also added into the jar and mixed for about 30 seconds. Next, a flocculant copolymer (about 90% acrylamide and about 10% dimethylaminoethylacrylate methyl chloride) at about 1% concentration was added into the jar and mixed for about 15 seconds. The treated slurry was subsequently transferred to a pressing chamber for a press dewatering test. The doses of soy flour tested were about 4 lb/ton, about 8 lb/ton, and about 12 lb/ton, based on dry solids in the slurry. The dose of the components in the dewatering agent solution comprising both soy flour and a surfactant was about 8 lb/ton soy flour and about 2 lb/ton surfactant, based on dry solids in the slurry. The dosages tested of the copolymer flocculant were 0, about 6.25 lb/ton, about 12.5 lb/ton, about 18.75 lb/ton, and about 25 lb/ton, based on dry solids in the slurry.

Next, the above-treated slurries were transferred to the press chamber to undergo a first static press test. After the free water was drained, a felt was placed on the top of the sludge and 1 psi pressure was applied for about 1 minute, followed by about 7 psi pressure for about 2 minutes. The sludge cake was then removed from the press chamber and its weight was recorded. The sludge cake was also saved for a second static press test.

In the second static press test, the sludge cake saved from the first static press test was placed between 2 metal wires and pressed in a static press with a pressure of 0.7 mbar for about 2 minutes. The weight of the resulting cake was then recorded and then the cake was placed into an oven at 105° C. overnight. The dry weight of the cake was then measured. Dryness of the cake was calculated using the following formula:

Dryness(%)=Dry Weight (g)/Wet Weight (g)×100.

As can be seen in FIG. 1, dryness of the cake from the first static press test increased significantly when the flocculant dose was increased. Addition of soy flour with flocculant increased the dryness of the cake significantly as well. The dewatering agent solution comprising soy flour and surfactant improved the dewatering efficiency further when compared to soy flour itself, although soy flour by itself still resulted in a beneficial dewatering effect.

Figure 2:
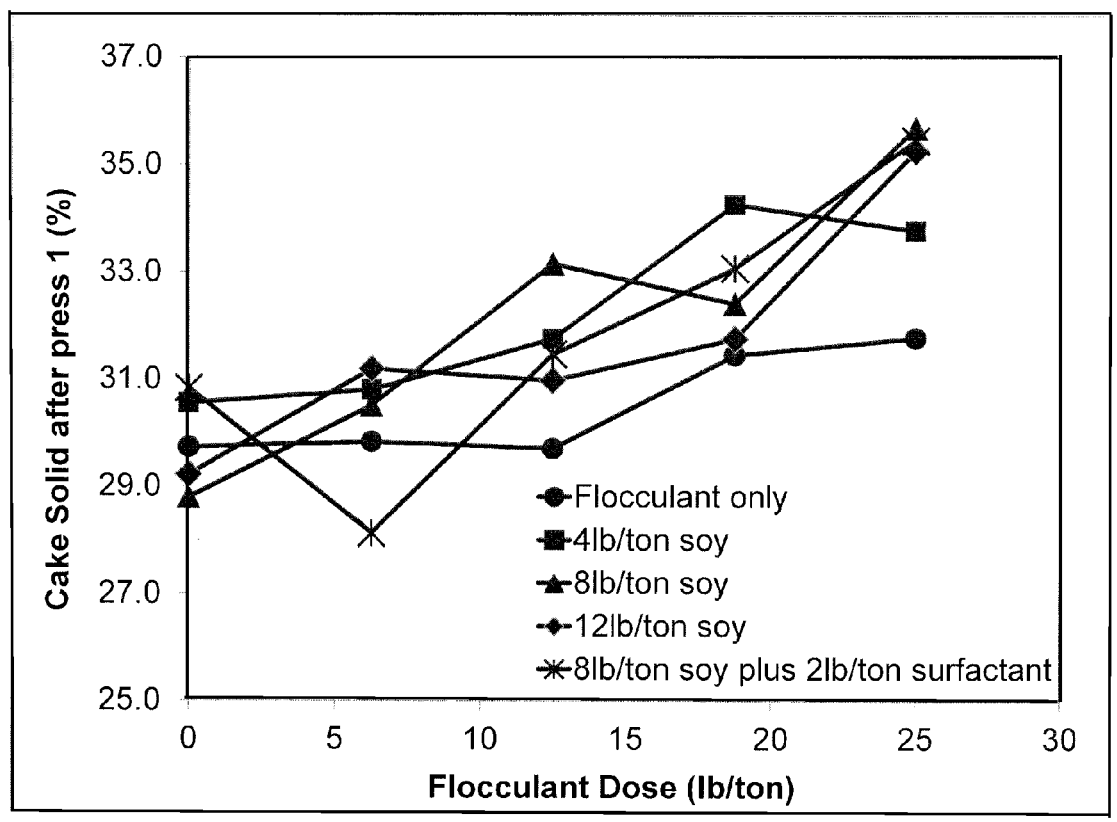
FIG. 2 depicts experimental data showing the effect of soy flour on press dewatering with the presence of a cationic flocculant.

As can be seen in FIG. 2, dryness of the cake after the second static press test increased much less when flocculant dosage was increased. Particularly, when the flocculant dosage increased from 18.75 lb/ton to 25 lb/ton, there was no further increase of cake dryness. Addition of soy flour or soy flour plus surfactant solution significantly increased the dryness of the cake. This improvement was more significant at a high flocculant dosage. For example, at a 25 lb/ton flocculant dose, addition of 8 lb/ton soy flour increased the dryness of the cake from 31% to 35%.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a dewatering agent" is intended to include "at least one dewatering agent" or "one or more dewatering agents."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method for improving the separation of solids from water comprising:
    adding a dewatering agent solution comprising less than about 15 weight % of a soy based component to the water, wherein the dewatering agent solution further comprises from about 36 weight % to about 76 weight % water, from about 2.5 weight % to about 5 weight % of a non-ionic surfactant, from about 0.9 weight % to about 1.8 weight % of sodium meta-bisulfate, from about 0.45 weight % to about 0.9 weight % of caustic, from about 0.1 weight % to about 0.2 weight % of a preservative, and up to about 0.5 weight % of a stabilizer.

2. The method of claim 1, wherein the soy based component comprises soy flour.

3. The method of claim 1, wherein the soy based component comprises soy protein.

4. The method of claim 1, wherein the stabilizer is selected from the group consisting of carboxymethyl cellulose, guar gum, xanthan gum, gum acacia, starch based gums, and any combination thereof.

5. The method of claim 1, wherein the stabilizer is activated prior to addition to the dewatering agent solution by dispersing it in water at about a concentration of about 1% by weight.

6. The method of claim 1, wherein the non-ionic surfactant comprises a triblock copolymer of polyethylene oxide-polypropylene oxide-polyethylene oxide (PEO-PPO-PEO).

7. The method of claim 1, wherein the caustic comprises sodium hydroxide and the preservative comprises benzyl isothiazolin.

8. A method for dewatering a wastewater slurry containing solids comprising:
    adding to the wastewater slurry an aqueous dewatering agent solution comprising from about 36 weight % to about 76 weight % water, from about 10 weight % to about 20 weight % of a soy based component, from about 2.5 weight % to about 5 weight % of a non-ionic surfactant, from about 0.9 weight % to about 1.8 weight % of a sodium meta-bisulfite, from about 0.45 weight % to about 0.9 weight % of a caustic, and from about 0.1 weight % to about 0.2 weight % of a preservative;
    forming a mixture of water, dewatering agent solution, and flocculated solids; and
    separating the flocculated solids from the water.

9. The method of claim 8, wherein the soy based component comprises soy flour and/or soy protein.

10. The method of claim 8, wherein the dewatering agent solution comprises up to about 0.5 weight % of a stabilizer, further wherein the soy based component is soy flour.

11. The method of claim 10, wherein the stabilizer is selected from the group consisting of carboxymethyl cellulose, guar gum, xanthan gum, gum acacia, starch based gums, and any combination thereof.

12. The method of claim 8, wherein the non-ionic surfactant comprises a triblock copolymer of polyethylene oxide-polypropylene oxide-polyethylene oxide (PEO-PPO-PEO) and the preservative comprises benzyl isothiazolin.

13. A dewatering agent solution for improving the separation of solids from water, the solution comprising:
    from about 36 weight % to about 76 weight % water;
    from about 10 weight % to about 20 weight % of a soy based component;
    from about 2.5 weight % to about 5 weight % of a non-ionic surfactant;
    from about 0.9 weight % to about 1.8 weight % of sodium meta-bisulfite;
    from about 0.45 weight % to about 0.9 weight % of caustic;
    from about 0.1 weight % to about 0.2 weight % of benzyl isothiazolin; and
    optionally from about 0 weight % to about 0.5 weight % of a stabilizer.

14. The dewatering agent solution of claim 13, wherein the soy based component comprises soy flour and/or soy protein, the optional stabilizer is selected from the group consisting of carboxymethyl cellulose, guar gum, xanthan gum, gum acacia, starch based gums, and any combination thereof, the non-ionic surfactant comprises a triblock copolymer of polyethylene oxide-polypropylene oxide-polyethylene oxide (PEO-PPO-PEO), and the caustic comprises sodium hydroxide.

* * * * *